United States Patent
Sumasu

(10) Patent No.: US 9,991,839 B2
(45) Date of Patent: Jun. 5, 2018

(54) MOTOR CONTROLLER

(71) Applicant: JTEKT CORPORATION, Osaka-shi, Osaka (JP)

(72) Inventor: Hiroshi Sumasu, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days. days.

(21) Appl. No.: 15/696,634

(22) Filed: Sep. 6, 2017

(65) Prior Publication Data
US 2018/0083564 A1 Mar. 22, 2018

(30) Foreign Application Priority Data
Sep. 16, 2016 (JP) ................................. 2016-181968

(51) Int. Cl.
| H02P 27/08 | (2006.01) |
| H02M 1/44 | (2007.01) |
| H02P 29/50 | (2016.01) |
| H02P 21/22 | (2016.01) |

(52) U.S. Cl.
CPC .............. *H02P 27/08* (2013.01); *H02M 1/44* (2013.01); *H02P 21/22* (2016.02); *H02P 29/50* (2016.02)

(58) Field of Classification Search
CPC ................................ H02P 27/08; H02P 21/22
USPC ........................................ 318/400.02, 400.01
See application file for complete search history.

(56) References Cited

U.S. PATENT DOCUMENTS

| 6,512,341 | B2 * | 1/2003 | Matsushiro | ............. H02P 6/085 318/400.01 |
| 2005/0069301 | A1 | 3/2005 | Gallagher et al. | |
| 2016/0190970 | A1 * | 6/2016 | Yamazaki | ............... H02P 27/08 318/400.29 |
| 2017/0093312 | A1 * | 3/2017 | Hano | ........................ H02P 6/15 |

FOREIGN PATENT DOCUMENTS

| DE | 102013005355 A1 | 10/2013 |
| EP | 1914874 A2 | 4/2008 |
| EP | 3007345 A1 | 4/2016 |
| JP | S64-50766 A | 2/1989 |
| JP | 2012239330 A | * 12/2012 |

OTHER PUBLICATIONS

Feb. 16, 2018 Extended European Search Report issued in Eupropean Patent Application 17190711.

* cited by examiner

*Primary Examiner* — Kawing Chan
(74) *Attorney, Agent, or Firm* — Oliff PLC

(57) ABSTRACT

A maximum spectrum peak reduction unit sets a PWM count generated by a PWM duty ratio calculation unit for a specific current control period as PWM counts for respective PWM periods within the current control period, and changes the set PWM counts for the respective PWM periods within the current control period so that a frequency component having a frequency obtained by dividing a carrier frequency in half or less is included in a PWM signal waveform within the current control period without changing a total value of the PWM counts for the respective PWM periods.

3 Claims, 16 Drawing Sheets

| PERIOD NUMBER i | 1 | 2 | 3 | 4 | 5 | 6 | 7 | 8 | 9 | 10 | TOTAL |
|---|---|---|---|---|---|---|---|---|---|---|---|
| PWM COUNT BEFORE CHANGE | 500 | 500 | 500 | 500 | 500 | 500 | 500 | 500 | 500 | 500 | 5000 |
| VARIATION | -50 | 50 | -50 | 50 | -50 | 50 | -50 | 50 | -50 | 50 | 0 |
| PWM COUNT AFTER CHANGE | 450 | 550 | 450 | 550 | 450 | 550 | 450 | 550 | 450 | 550 | 5000 |

FIG. 6A

| PERIOD NUMBER i | 1 | 2 | 3 | 4 | 5 | 6 | 7 | 8 | 9 | 10 |
|---|---|---|---|---|---|---|---|---|---|---|
| VARIATION | $-X$ | $+X$ | $-X$ | $+X$ | $-X$ | $+X$ | $-X$ | $+X$ | $-X$ | $+X$ |

FIG. 6B

| PERIOD NUMBER i | 1 | 2 | 3 | 4 | 5 | 6 |
|---|---|---|---|---|---|---|
| VARIATION | $+X$ | $-\frac{X}{2}$ | $-\frac{X}{2}$ | $+X$ | $-\frac{X}{2}$ | $-\frac{X}{2}$ |

FIG. 6C

| PERIOD NUMBER i | 1 | 2 | 3 | 4 | 5 | 6 | 7 | 8 |
|---|---|---|---|---|---|---|---|---|
| VARIATION | $+X$ | $+X$ | $-X$ | $-X$ | $+X$ | $+X$ | $-X$ | $-X$ |

FIG. 6D

| PERIOD NUMBER i | 1 | 2 | 3 | 4 | 5 | 6 | 7 | 8 | 9 | 10 |
|---|---|---|---|---|---|---|---|---|---|---|
| VARIATION | $+X$ | $+X$ | $-\frac{2}{3}X$ | $-\frac{2}{3}X$ | $-\frac{2}{3}X$ | $+X$ | $+X$ | $-\frac{2}{3}X$ | $-\frac{2}{3}X$ | $-\frac{2}{3}X$ |

FIG. 6E

| PERIOD NUMBER i | 1 | 2 | 3 | 4 | 5 | 6 | 7 | 8 | 9 | 10 | 11 | 12 |
|---|---|---|---|---|---|---|---|---|---|---|---|---|
| VARIATION | $+X$ | $+X$ | $+X$ | $-X$ | $-X$ | $-X$ | $+X$ | $+X$ | $+X$ | $-X$ | $-X$ | $-X$ |

FIG. 6F

| PERIOD NUMBER i | 1 | 2 | 3 | 4 | 5 | 6 | 7 | 8 | 9 | 10 |
|---|---|---|---|---|---|---|---|---|---|---|
| VARIATION | $+X$ | $+X$ | $+X$ | $+X$ | $+X$ | $-X$ | $-X$ | $-X$ | $-X$ | $-X$ |

FIG. 9A

| PERIOD NUMBER i | 1 | 2 | 3 | 4 | 5 | 6 | 7 | 8 | 9 | 10 |
|---|---|---|---|---|---|---|---|---|---|---|
| VARIATION | -50 | 50 | -50 | 50 | -50 | 50 | -50 | 50 | -50 | 50 |

FIG. 9B

| PERIOD NUMBER i | 1 | 2 | 3 | 4 | 5 | 6 | 7 | 8 | 9 | 10 |
|---|---|---|---|---|---|---|---|---|---|---|
| REFERENCE VARIATION VALUE | -1 | +1 | -1 | +1 | -1 | +1 | -1 | +1 | -1 | +1 |

FIG. 10

| PERIOD NUMBER i | 1 | 2 | 3 | 4 | 5 | 6 | 7 | 8 | 9 | 10 | TOTAL |
|---|---|---|---|---|---|---|---|---|---|---|---|
| PWM COUNT BEFORE CHANGE | 500 | 500 | 500 | 500 | 500 | 500 | 500 | 500 | 500 | 500 | 5000 |
| VARIATION | -50 | 50 | -50 | 50 | -50 | 50 | -50 | 50 | -50 | 50 | 0 |
| PWM COUNT AFTER CHANGE | 450 | 550 | 450 | 550 | 450 | 550 | 450 | 550 | 450 | 550 | 5000 |

*FIG. 12*

| PERIOD NUMBER i | 1 | 2 | 3 | 4 | 5 | 6 | 7 | 8 | 9 | 10 |
|---|---|---|---|---|---|---|---|---|---|---|
| VARIATION | 25 | 25 | 25 | 25 | 25 | −25 | −25 | −25 | −25 | −25 |

FIG. 13

| PERIOD NUMBER i | 1 | 2 | 3 | 4 | 5 | 6 | 7 | 8 | 9 | 10 | TOTAL |
|---|---|---|---|---|---|---|---|---|---|---|---|
| PWM COUNT BEFORE CHANGE | 500 | 500 | 500 | 500 | 500 | 500 | 500 | 500 | 500 | 500 | 5000 |
| VARIATION FOR FREQUENCY DIVISION BY FACTOR OF 2 | -50 | 50 | -50 | 50 | -50 | 50 | -50 | 50 | -50 | 50 | 0 |
| VARIATION FOR FREQUENCY DIVISION BY FACTOR OF 10 | 25 | 25 | 25 | 25 | 25 | -25 | -25 | -25 | -25 | -25 | 0 |
| TOTAL VARIATION VALUE | -25 | 75 | -25 | 75 | -25 | 25 | -75 | 25 | -75 | 25 | 0 |
| PWM COUNT AFTER CHANGE | 475 | 575 | 475 | 575 | 475 | 525 | 425 | 525 | 425 | 525 | 5000 |

MOTOR CONTROLLER

INCORPORATION BY REFERENCE

The disclosure of Japanese Patent Application No. 2016-181968 filed on Sep. 16, 2016 including the specification, drawings and abstract, is incorporated herein by reference in its entirety.

BACKGROUND OF THE INVENTION

1. Field of the Invention

The present invention relates to a motor controller configured to perform pulse width modulation (PWM) drive on an electric motor.

2. Description of the Related Art

In a motor controller configured to perform vector control on a three-phase electric motor, two-phase current command values are calculated for each current control period. Two-phase voltage command values are calculated based on deviations between the two-phase current command values and detected two-phase current values. The two-phase voltage command values are subjected to two-phase/three-phase conversion by using a rotation angle of the electric motor. Thus, U-phase, V-phase, and W-phase voltage command values (three-phase voltage command values) are calculated. A U-phase PWM signal, a V-phase PWM signal, and a W-phase PWM signal having duty ratios respectively corresponding to the U-phase, V-phase, and W-phase voltage command values are generated and supplied to a three-phase inverter circuit.

Power devices constituting the inverter circuit are controlled by the U-phase PWM signal, the V-phase PWM signal, and the W-phase PWM signal. Therefore, voltages corresponding to the three-phase voltage command values are applied to the electric motor. Thus, the electric motor is controlled so that the values of motor currents flowing through the electric motor are equal to the two-phase current command values.

In the motor controller configured to perform PWM drive on the electric motor, in a period in which the duty ratio of a PWM signal waveform is approximately constant, a spectrum of the PWM output waveform shows peaks at a carrier frequency (frequency of the PWM signal) and a frequency corresponding to an integral multiple of the carrier frequency. The carrier frequency is a frequency at which the amplitude value of the spectrum is maximum (maximum peak frequency) (see Japanese Patent Application Publication No. 1-50766 (JP 1-50766 A)).

In this case, it is likely that a noise having the same frequency as the carrier frequency and a noise having a frequency corresponding to an integral multiple of the carrier frequency are generated. Regarding the frequency components of those noises, the amplitude value is maximum at the frequency component having the same frequency as the carrier frequency.

SUMMARY OF THE INVENTION

It is one object of the present invention to provide a motor controller capable of reducing a noise component having the same frequency as a carrier frequency when a plurality of PWM periods are included in a current control period.

A motor controller according to one aspect of the present invention has the following features in its configuration. That is, the motor controller is configured such that a plurality of PWM periods are included in a current control period and an electric motor is controlled based on PWM signals generated for the respective PWM periods within the current control period. The motor controller includes a PWM count generator configured to generate a PWM count for each current control period, a PWM count changer configured to set a PWM count generated by the PWM count generator for a specific current control period as PWM counts for respective PWM periods within the specific current control period, and to change the set PWM counts for the respective PWM periods within the specific current control period so that a frequency component having a frequency obtained by dividing a carrier frequency in half or less is included in a PWM signal waveform within the specific current control period without changing a total value of the PWM counts for the respective PWM periods, and a PWM signal generator configured to generate PWM signals for the respective PWM periods based on the PWM counts for the respective PWM periods within the specific current control period after being changed by the PWM count changer.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 6A to FIG. 6F are tables illustrating examples of variation patterns;

FIG. 9A is a table illustrating contents of a variation table based on the variation pattern illustrated in FIG. 6A;

FIG. 9B is a table illustrating an example of contents of a reference variation value table that stores reference variation values each having an absolute value of 1;

FIG. 10 is a table for describing an example of the operation to be performed by the maximum spectrum peak reduction unit;

FIG. 12 is a table illustrating contents of a variation table based on the variation pattern illustrated in FIG. 6F; and FIG. 13 is a table for describing another example of the operation to be performed by the maximum spectrum peak reduction unit.

DETAILED DESCRIPTION OF EMBODIMENTS

Figure 1:
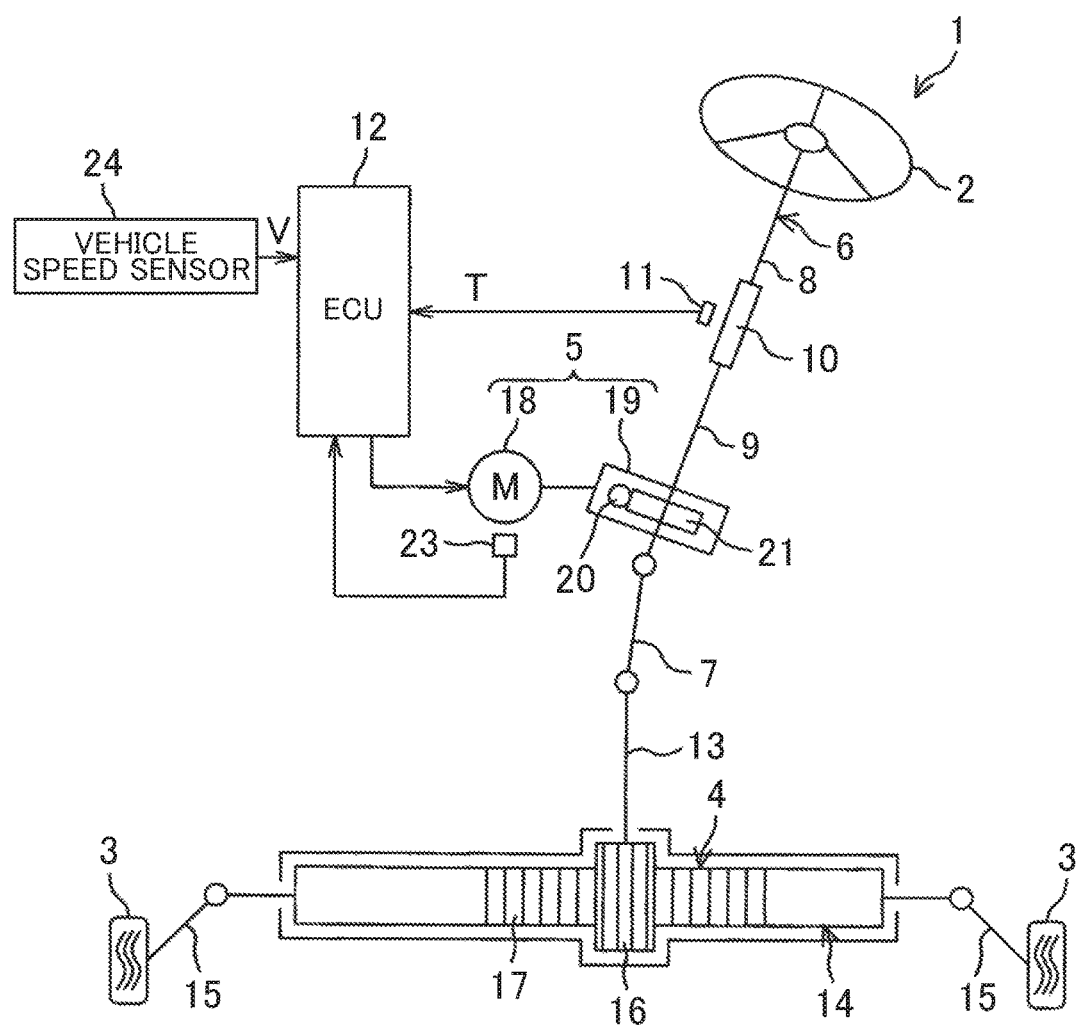
FIG. 1 is a schematic diagram illustrating the schematic configuration of an electric power steering system according to one embodiment of the present invention.

An embodiment of the present invention that is applied to an electric power steering system is described below in detail with reference to the accompanying drawings. FIG. 1 is a schematic diagram illustrating the schematic configuration of an electric power steering system to which a motor controller according to one embodiment of the present invention is applied. An electric power steering (EPS) system 1 includes a steering wheel 2, a steering operation mechanism 4, and a steering assist mechanism 5. The steering wheel 2 is a steering member for controlling steering of a vehicle. The steering operation mechanism 4 turns steered wheels 3 in association with rotation of the steering wheel 2. The steering assist mechanism 5 assists driver's steering operation. The steering wheel 2 and the steering operation mechanism 4 are mechanically coupled to each other through intermediation of a steering shaft 6 and an intermediate shaft 7.

The steering shaft 6 includes an input shaft 8 coupled to the steering wheel 2, and an output shaft 9 coupled to the intermediate shaft 7. The input shaft 8 and the output shaft 9 are coupled to each other in a relatively rotatable manner through intermediation of a torsion bar 10. A torque sensor 11 is arranged near the torsion bar 10. The torque sensor 11 detects a steering torque T applied to the steering wheel 2 based on a relative rotation shift amount of the input shaft 8 and the output shaft 9. In this embodiment, for example, the steering torque T to be detected by the torque sensor 11 takes a positive value as a torque for steering to the right, and takes a negative value as a torque for steering to the left. As the absolute value of the steering torque T increases, the magnitude of the steering torque increases.

The steering operation mechanism 4 is constituted by a rack and pinion mechanism including a pinion shaft 13 and a rack shaft 14 serving as a steering operation shaft. The steered wheels 3 are coupled to both ends of the rack shaft 14 through intermediation of tie rods 15 and knuckle arms (not illustrated). The pinion shaft 13 is coupled to the intermediate shaft 7. The pinion shaft 13 is configured to rotate in association with the steering operation of the steering wheel 2. A pinion 16 is coupled to the distal end (lower end in FIG. 1) of the pinion shaft 13.

The rack shaft 14 linearly extends along a lateral direction of an automobile. A rack 17 meshing with the pinion 16 is formed at an axially middle part of the rack shaft 14. The pinion 16 and the rack 17 convert rotation of the pinion shaft 13 to axial movement of the rack shaft 14. The steered wheels 3 can be turned through the axial movement of the rack shaft 14.

When the steering wheel 2 is steered (rotated), the rotation is transmitted to the pinion shaft 13 via the steering shaft 6 and the intermediate shaft 7. The pinion 16 and the rack 17 convert the rotation of the pinion shaft 13 to axial movement of the rack shaft 14. Thus, the steered wheels 3 are turned. The steering assist mechanism 5 includes an electric motor 18 configured to assist steering operation, and a speed reducing mechanism 19 configured to transmit an output torque of the electric motor 18 to the steering operation mechanism 4. A rotation angle sensor 23 constituted by, for example, a resolver is arranged for the electric motor 18. The rotation angle sensor 23 is configured to detect a rotation angle of a rotor of the electric motor 18. The speed reducing mechanism 19 is constituted by a worm gear mechanism including a worm shaft 20 and a worm wheel 21 meshing with the worm shaft 20.

The worm shaft 20 is driven to rotate by the electric motor 18. The worm wheel 21 is coupled to the steering shaft 6 so as to be rotatable together. The worm wheel 21 is driven to rotate by the worm shaft 20. When the worm shaft 20 is driven to rotate by the electric motor 18, the worm wheel 21 is driven to rotate, so that the steering shaft 6 rotates. The rotation of the steering shaft 6 is transmitted to the pinion shaft 13 via the intermediate shaft 7. The rotation of the pinion shaft 13 is converted to axial movement of the rack shaft 14. Thus, the steered wheels 3 are turned. That is, the worm shaft 20 is driven to rotate by the electric motor 18. Thus, the steered wheels 3 are turned.

The vehicle is provided with a vehicle speed sensor 24 configured to detect a vehicle speed V. The steering torque T detected by the torque sensor 11, the vehicle speed V detected by the vehicle speed sensor 24, an output signal of the rotation angle sensor 23, and the like are input to an electronic control unit (ECU) 12. The ECU 12 controls the electric motor 18 based on the input signals.

Figure 2:
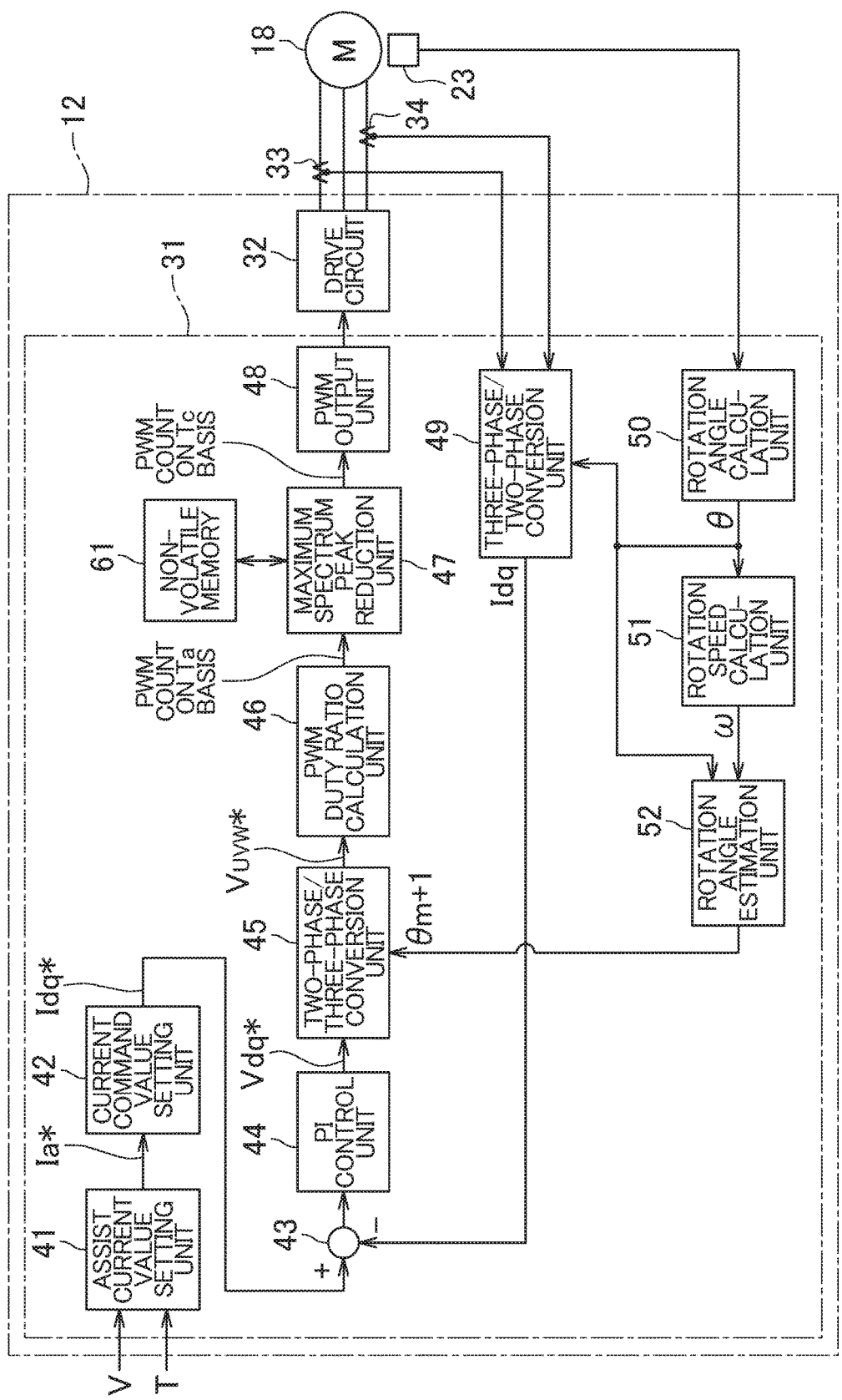
FIG. 2 is a block diagram illustrating the electric configuration of an ECU.

FIG. 2 is a block diagram illustrating the electric configuration of the ECU 12. The ECU 12 includes a microcomputer 31 and a drive circuit (inverter circuit) 32. The drive circuit 32 is controlled by the microcomputer 31 to supply electric power to the electric motor 18. Two current sensors 33 and 34 are provided on power supply lines for connecting the drive circuit 32 and the electric motor 18 to each other. The current sensors 33 and 34 are provided so as to detect phase currents flowing through two power supply lines out of the three power supply lines for connecting the drive circuit 32 and the electric motor 18 to each other.

Figure 3:
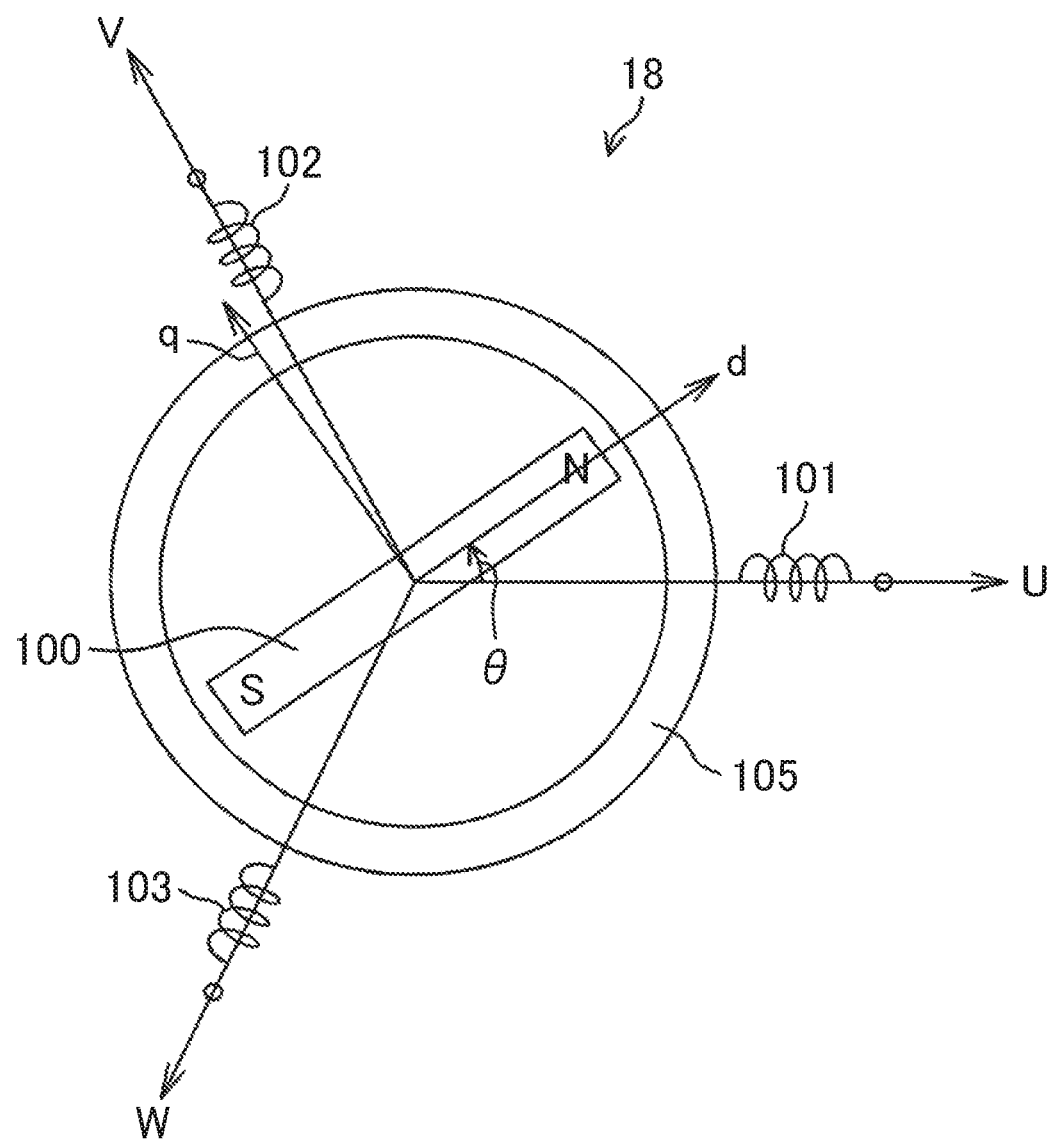
FIG. 3 is a schematic diagram illustrating the configuration of an electric motor.

The electric motor 18 is, for example, a three-phase brushless motor. As schematically illustrated in FIG. 3, the electric motor 18 includes a rotor 100 serving as a field magnet, and a stator 105 including U-phase, V-phase, and W-phase stator coils 101, 102, and 103. There is defined a three-phase stationary coordinate system (UVW coordinate system) including a U-axis, a V-axis, and a W-axis extending in directions of the U-phase, V-phase, and W-phase stator coils 101, 102, and 103. There is also defined a two-phase rotating coordinate system (dq coordinate system or actual rotating coordinate system) including a d-axis (magnetic pole axis) extending in a direction of magnetic poles of the rotor 100, and a q-axis (torque axis) extending in a direction perpendicular to the d-axis within a rotational plane of the rotor 100. In the dq coordinate system, only a q-axis current contributes to torque generation in the rotor 100. Therefore, it is appropriate that the q-axis current be controlled in accordance with a desired torque while a d-axis current is set to zero. A rotation angle (electrical angle) θ of the rotor 100 is a rotation angle of the d-axis with respect to the U-axis. The dq coordinate system is an actual rotating coordinate system based on the rotor rotation angle θ. The use of the rotor rotation angle θ allows coordinate conversion between the UVW coordinate system and the dq coordinate system.

Referring back to FIG. 2, the microcomputer 31 includes a CPU and memories (ROM, RAM, non-volatile memory 61, and the like), and executes predetermined programs to function as a plurality of functional processing units. The functional processing units include an assist current value setting unit 41, a current command value setting unit 42, a current deviation calculation unit 43, a proportional-integral (PI) control unit 44, a two-phase/three-phase conversion unit 45, a PWM duty ratio calculation unit 46, a maximum spectrum peak reduction unit 47, a PWM output unit 48, a three-phase/two-phase conversion unit 49, a rotation angle calculation unit 50, a rotation speed calculation unit 51, and a rotation angle estimation unit 52.

Figure 4:
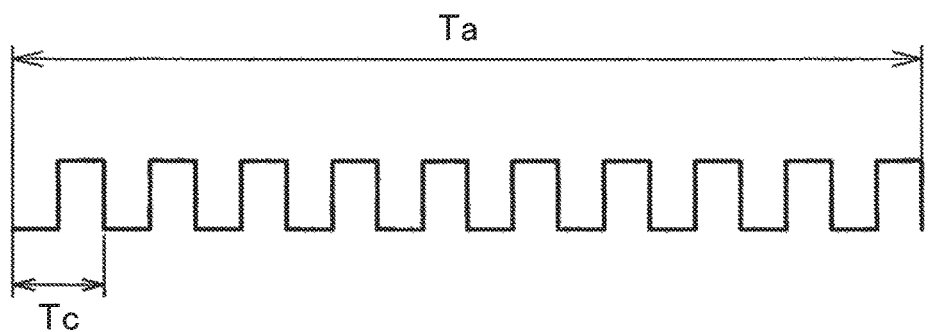
FIG. 4 is a schematic diagram illustrating a relationship between a period Tc of a PWM signal and a current control period Ta.

As illustrated in FIG. 4, a period Tc of a PWM signal (hereinafter referred to as "PWM period Tc") is shorter than a current control period Ta. In this embodiment, Tc is one-tenth of Ta. In other words, 10 PWM periods Tc are included in the current control period Ta. A first period out of the 10 PWM periods Tc may be referred to as Period 1, and other subsequent periods may be referred to as Periods 2, 3, . . . 9, and 10. The period number of the PWM period may be represented by "i" (i=1, 2, . . . 9, 10). The frequency of the PWM signal (=1/Tc) is referred to as a carrier frequency.

The number of PWM clocks corresponding to the PWM period Tc is referred to as a maximum PWM count Cmax. For example, when the number of PWM clocks of a computer is 100 [MHz] and the frequency of the PWM signal (hereinafter referred to as "PWM frequency") is 100 [kHz], the maximum PWM count Cmax is 100,000,000×(1/100,000)=1000. The resolution of a voltage applied to the electric motor 18 (stepsize of an applied voltage; hereinafter referred to as "voltage resolution Vr") is expressed by Vr=Vb/Cmax, where Cmax represents the maximum PWM count and Vb represents a power supply voltage of the drive circuit 32. Thus, the voltage resolution Vr is Vb/1000 [V/LSB]. As the value of the voltage resolution Vr decreases, the stepsize of an applied voltage is finer, and hence the voltage resolution increases. In other words, as the value of the voltage resolution Vr increases, the stepsize of an applied voltage is coarser, and hence the voltage resolution decreases.

Referring back to FIG. 2, the rotation angle calculation unit 50 calculates a rotation angle (electrical angle) θ of the rotor of the electric motor 18 for each current control period Ta based on an output signal of the rotation angle sensor 23. The rotor rotation angle θ calculated by the rotation angle calculation unit 50 is supplied to the three-phase/two-phase conversion unit 49, the rotation speed calculation unit 51, and the rotation angle estimation unit 52. In this embodiment, the timing when the rotor rotation angle θ is acquired (detected) is a timing in the middle of the current control period Ta.

The rotation speed calculation unit 51 calculates a rotation speed (angular velocity) ω of the rotor of the electric motor 18 by a time derivative of the rotor rotation angle θ calculated by the rotation angle calculation unit 50. The rotation speed ω calculated by the rotation speed calculation unit 51 is supplied to the rotation angle estimation unit 52. The rotation angle estimation unit 52 estimates a rotor rotation angle $\theta_{(m+1)}$ in the middle of a subsequent current control period Ta based on Expression (1) by using a rotor rotation angle $\theta_{(m-1)}$ in the middle of a previous current control period Ta, which is acquired in the previous current control period Ta.

$$\theta_{(m+1)} = \theta_{(m-1)} + \omega \cdot 2Ta \quad (1)$$

Figure 5:
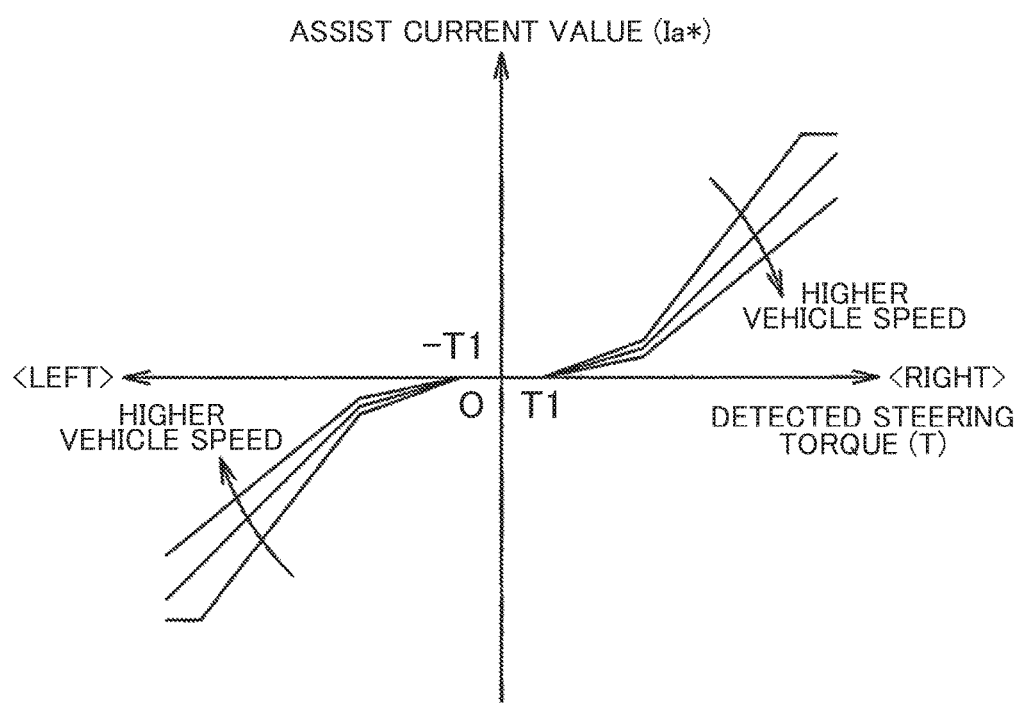
FIG. 5 is a graph illustrating an example of setting an assist current value Ia* relative to a detected steering torque T.

The rotor rotation angle $\theta_{(m+1)}$ in the subsequent current control period Ta, which is estimated by the rotation angle estimation unit 52, is supplied to the two-phase/three-phase conversion unit 45. The assist current value setting unit 41 sets an assist current value Ia* for each current control period Ta based on the steering torque T detected by the torque sensor 11 and the vehicle speed V detected by the vehicle speed sensor 24. FIG. 5 illustrates an example of setting the assist current value Ia* relative to the detected steering torque T. For example, the detected steering torque T takes a positive value as a torque for steering to the right, and takes a negative value as a torque for steering to the left. The assist current value Ia* takes a positive value when the electric motor 18 generates a steering assist force for steering to the right, and takes a negative value when the electric motor 18 generates a steering assist force for steering to the left. The assist current value Ia* is positive when the detected steering torque T takes a positive value, and is negative when the detected steering torque T takes a negative value.

When the detected steering torque T takes an infinitesimal value that falls within a range (torque dead band) from −T1 to T1 (for example, T1=0.4 N·m), the assist current value Ia* is set to zero. When the detected steering torque T takes a value that falls out of the range from −T1 to T1, the assist current value Ia* is set so that its absolute value increases as the absolute value of the detected steering torque T increases. The assist current value Ia* is set so that its absolute value decreases as the vehicle speed V detected by the vehicle speed sensor 24 increases. Thus, the steering assist force is greater when the vehicle travels at a lower speed, and is weaker when the vehicle travels at a higher speed.

The current command value setting unit 42 sets values of currents to be caused to flow in the coordinate axes of the dq coordinate system as current command values based on the assist current value Ia* set by the assist current value setting unit 41. Specifically, the current command value setting unit 42 sets a d-axis current command value $I_d^*$ and a q-axis current command value $I_q^*$ (hereinafter referred to as "two-phase current command values $I_{dq}^*$" when collectively called). More specifically, the current command value setting unit 42 sets the q-axis current command value $I_q^*$ to the assist current value Ia* set by the assist current value setting unit 41 while setting the d-axis current command value $I_d^*$ to zero. The two-phase current command values $I_{dq}^*$ set by the current command value setting unit 42 are supplied to the current deviation calculation unit 43.

The three-phase/two-phase conversion unit 49 first calculates a U-phase current $I_U$, a V-phase current $I_V$, and a W-phase current $I_W$ (hereinafter referred to as "detected three-phase currents $I_{UVW}$" when collectively called) based on two-phase currents detected by the current sensors 33 and 34. The three-phase/two-phase conversion unit 49 performs coordinate conversion from the detected three-phase currents $I_{UVW}$ of the UVW coordinate system to detected two-phase currents $I_{dq}$ of the dq coordinate system. The detected two-phase currents $I_{dq}$ are constituted by a detected d-axis current $I_d$ and a detected q-axis current $I_q$. The rotor rotation angle θ calculated by the rotation angle calculation unit 50 is used for the coordinate conversion.

The current deviation calculation unit 43 calculates a deviation of the detected d-axis current $I_d$ from the d-axis current command value $I_d^*$ and a deviation of the detected q-axis current $I_q$ from the q-axis current command value $I_q^*$. The deviations are supplied to the PI control unit 44. The PI control unit 44 generates two-phase voltage command values $V_{dq}^*$ (d-axis voltage command value $V_d^*$ and q-axis voltage command value $V_q^*$) for voltages to be applied to the electric motor 18 by performing PI calculation on the current deviations calculated by the current deviation calculation unit 43. The two-phase voltage command values $V_{dq}^*$ are supplied to the two-phase/three-phase conversion unit 45.

The two-phase/three-phase conversion unit 45 performs two-phase/three-phase conversion on the two-phase voltage command values $V_{dq}^*$ calculated by the PI control unit 44 in a current control period Ta of this time by using the estimated rotation angle value $\theta_{(m+1)}$ for the subsequent current control period Ta, which is calculated by the rotation angle estimation unit 52 in the current control period Ta of this time. Thus, the two-phase/three-phase conversion unit 45 calculates three-phase voltage command values $V_{UVW}^*$ for the subsequent current control period Ta. The three-phase voltage command values $V_{UVW}^*$ are constituted by a U-phase voltage command value $V_U^*$, a V-phase voltage command value $V_V^*$, and a W-phase voltage command value $V_W^*$. In this manner, the three-phase voltage command values $V_{UVW}^*$ for the subsequent current control period Ta are obtained.

The three-phase voltage command values $V_{UVW}^*$ for the subsequent current control period Ta, which are obtained by the two-phase/three-phase conversion unit 45, are supplied to the PWM duty ratio calculation unit 46. The PWM duty ratio calculation unit 46 generates a U-phase PWM count (PWM duty ratio), a V-phase PWM count, and a W-phase PWM count for the subsequent current control period Ta based on the three-phase voltage command values $V_{UVW}^*$ for the subsequent current control period Ta. The U-phase PWM count, the V-phase PWM count, and the W-phase PWM count are supplied to the maximum spectrum peak reduction unit 47.

For example, the U-phase PWM count is obtained as follows. That is, the PWM duty ratio calculation unit 46 calculates a U-phase PWM count Cu for a specific current control period based on Expression (2) by using a U-phase voltage command value $V_U^*$ for the current control period, which is obtained by the two-phase/three-phase conversion unit 45, and the maximum PWM count Cmax.

$$Cu = V_U^* \times (Cmax/Vb) = V_U^* \times (1{,}000/Vb) \quad (2)$$

In Expression (2), Vb represents a power supply voltage of the drive circuit 32.

A V-phase PWM count Cv can be calculated when a V-phase voltage command value $V_V^*$ is used in place of the U-phase voltage command value $V_U^*$ on the right-hand side of Expression (2). A W-phase PWM count Cw can be calculated when a W-phase voltage command value $V_W^*$ is used in place of the U-phase voltage command value $V_U^*$. The maximum spectrum peak reduction unit 47 is provided in order to reduce a noise component having the same frequency as the frequency of the PWM signal (carrier frequency=1/Tc) (noise component at which the amplitude of a spectrum is maximum). The maximum spectrum peak reduction unit 47 generates U-phase PWM counts, V-phase PWM counts, and W-phase PWM counts for the respective PWM periods Tc within the subsequent current control period Ta based on the U-phase PWM count, the V-phase PWM count, and the W-phase PWM count for the subsequent current control period Ta, which are supplied from the PWM duty ratio calculation unit 46. Details of operation to be performed by the maximum spectrum peak reduction unit 47 are described later. The U-phase PWM counts, the V-phase PWM counts, and the W-phase PWM counts for the respective PWM periods Tc within the subsequent current control period Ta, which are generated by the maximum spectrum peak reduction unit 47, are supplied to the PWM output unit 48.

The PWM output unit 48 stores, over a plurality of current control periods, U-phase PWM counts, V-phase PWM counts, and W-phase PWM counts for the respective PWM periods Tc within the current control periods Ta, which are supplied from the maximum spectrum peak reduction unit 47. Based on U-phase PWM counts, V-phase PWM counts, and W-phase PWM counts for the respective PWM periods Tc within the current control period Ta of this time, which are supplied from the maximum spectrum peak reduction unit 47 in the previous current control period Ta, the PWM output unit 48 generates U-phase PWM signals, V-phase PWM signals, and W-phase PWM signals for the respective PWM periods Tc within the current control period Ta of this time, and supplies the U-phase PWM signals, the V-phase PWM signals, and the W-phase PWM signals to the drive circuit 32. Specifically, in the respective PWM periods Tc within the current control period Ta of this time, the PWM output unit 48 generates U-phase PWM signals, V-phase PWM signals, and W-phase PWM signals having duty ratios respectively corresponding to the U-phase PWM counts, the V-phase PWM counts, and the W-phase PWM counts for the respective PWM periods Tc within the current control period Ta, and supplies the U-phase PWM signals, the V-phase PWM signals, and the W-phase PWM signals to the drive circuit 32.

The drive circuit 32 is a three-phase inverter circuit adapted to the U-phase, the V-phase, and the W-phase. Power devices constituting the inverter circuit are controlled by the PWM signals supplied from the PWM output unit 48. Thus, voltages corresponding to the three-phase voltage command values $V_{UVW}^*$ for the respective PWM periods Tc are applied to the U-phase, V-phase, and W-phase stator coils 101, 102, and 103 of the electric motor 18.

The current deviation calculation unit 43 and the PI control unit 44 constitute a current feedback controller. Through operation of the current feedback controller, the electric motor 18 is controlled so that the values of motor currents flowing through the electric motor 18 are close to the two-phase current command values $I_{dq}^*$ set by the current command value setting unit 42. The operation to be performed by the maximum spectrum peak reduction unit 47 is described below in detail. The maximum spectrum peak reduction unit 47 calculates the U-phase PWM counts for the respective PWM periods Tc within the subsequent current control period Ta based on the U-phase PWM count for the subsequent current control period Ta, which is supplied from the PWM duty ratio calculation unit 46. The maximum spectrum peak reduction unit 47 calculates the V-phase PWM counts for the respective PWM periods Tc within the subsequent current control period Ta based on the V-phase PWM count for the subsequent current control period Ta, which is supplied from the PWM duty ratio calculation unit 46. The maximum spectrum peak reduction unit 47 calculates the W-phase PWM counts for the respective PWM periods Tc within the subsequent current control period Ta based on the W-phase PWM count for the subsequent current control period Ta, which is supplied from the PWM duty ratio calculation unit 46. Methods for calculating the U-phase, V-phase, and W-phase PWM counts for the respective PWM periods Tc within the subsequent current control period Ta are similar to each other. Therefore, only the method for calculating the U-phase PWM counts is described.

A basic concept of noise reduction to be performed by the maximum spectrum peak reduction unit 47 is described. A plurality of PWM periods Tc are included in the current control period Ta. Therefore, the U-phase PWM count for the subsequent current control period Ta, which is supplied from the PWM duty ratio calculation unit 46, is basically set as the U-phase PWM counts for the respective PWM periods Tc within the subsequent current control period Ta. In this way, however, the U-phase PWM counts for the respective PWM periods Tc within the subsequent current control period Ta have the same values. Then, a spectrum of a PWM signal waveform corresponding to the U-phase PWM counts shows peaks at the carrier frequency (=1/Tc) and a frequency corresponding to an integral multiple of the carrier frequency. Therefore, it is likely that a noise having the same frequency as the carrier frequency and a noise having a frequency corresponding to an integral multiple of the carrier frequency are generated. Regarding the frequency components of those noises, the amplitude value is maximum at the frequency component having the same frequency as the carrier frequency.

The maximum spectrum peak reduction unit 47 changes the U-phase PWM signal waveform for the subsequent current control period Ta so that a frequency component having a frequency obtained by dividing the carrier frequency in half or less and a harmonic component having a frequency corresponding to an integral multiple of the divided frequency are included in the PWM signal waveform for the current control period Ta in addition to the frequency component having the same frequency as the carrier frequency and the harmonic component having a frequency corresponding to an integral multiple of the carrier frequency. However, the sum of the voltages of the U-phase PWM signal waveform for the subsequent current control period Ta is not changed.

When the U-phase PWM signal waveform for the subsequent current control period Ta is changed in this manner, the frequency components included in the U-phase PWM signal waveform for the subsequent current control period Ta are dispersed into more frequency components than those before the change. Thus, the frequency components of the noises originating from the PWM signal are also dispersed into more frequency components than those before the change. Accordingly, it is possible to reduce a maximum-amplitude noise component having the same frequency as the carrier frequency.

It is assumed that n is an integer equal to or larger than 2. In order that a frequency component having a frequency obtained by dividing the carrier frequency by n and a harmonic component having a frequency corresponding to an integral multiple of the divided frequency be included in the U-phase PWM signal waveform for the subsequent current control period Ta, it is appropriate that a frequency component having a period that is n times as long as the PWM period Tc be included in the U-phase PWM signal waveform for the current control period Ta. For example, in a case of n=2, it is appropriate that variations based on a variation pattern illustrated in, for example, FIG. 6A be added to the U-phase PWM counts Cu set for the respective PWM periods Tc within the subsequent current control period Ta. In FIG. 6A, x represents a variation definition value for defining an absolute value of the variation for the U-phase PWM count of the PWM period Tc. With this operation, the same waveform is repeated in every 2·Tc period. Therefore, a frequency component having the 2·Tc period is included in the U-phase PWM signal waveform for the subsequent current control period Ta. The variation definition value x may be set in advance or based on the U-phase PWM count for the subsequent current control period Ta, which is supplied from the PWM duty ratio calculation unit 46.

In a case of n=3, it is appropriate that variations based on a variation pattern illustrated in, for example, FIG. 6B be added to the U-phase PWM counts Cu set for the respective PWM periods Tc within the subsequent current control period Ta. In FIG. 6B, it is assumed that six PWM periods Tc are included in the current control period Ta. In a case of n=4, it is appropriate that variations based on a variation pattern illustrated in, for example, FIG. 6C be added to the U-phase PWM counts Cu set for the respective PWM periods Tc within the subsequent current control period Ta. In FIG. 6C, it is assumed that eight PWM periods Tc are included in the current control period Ta.

In a case of n=5, it is appropriate that variations based on a variation pattern illustrated in, for example, FIG. 6D be added to the U-phase PWM counts Cu set for the respective PWM periods Tc within the subsequent current control period Ta. In FIG. 6D, it is assumed that 10 PWM periods Tc are included in the current control period Ta. In a case of n=6, it is appropriate that variations based on a variation pattern illustrated in, for example, FIG. 6E be added to the U-phase PWM counts Cu set for the respective PWM periods Tc within the subsequent current control period Ta. In FIG. 6E, it is assumed that 12 PWM periods Tc are included in the current control period Ta.

Figure 7:
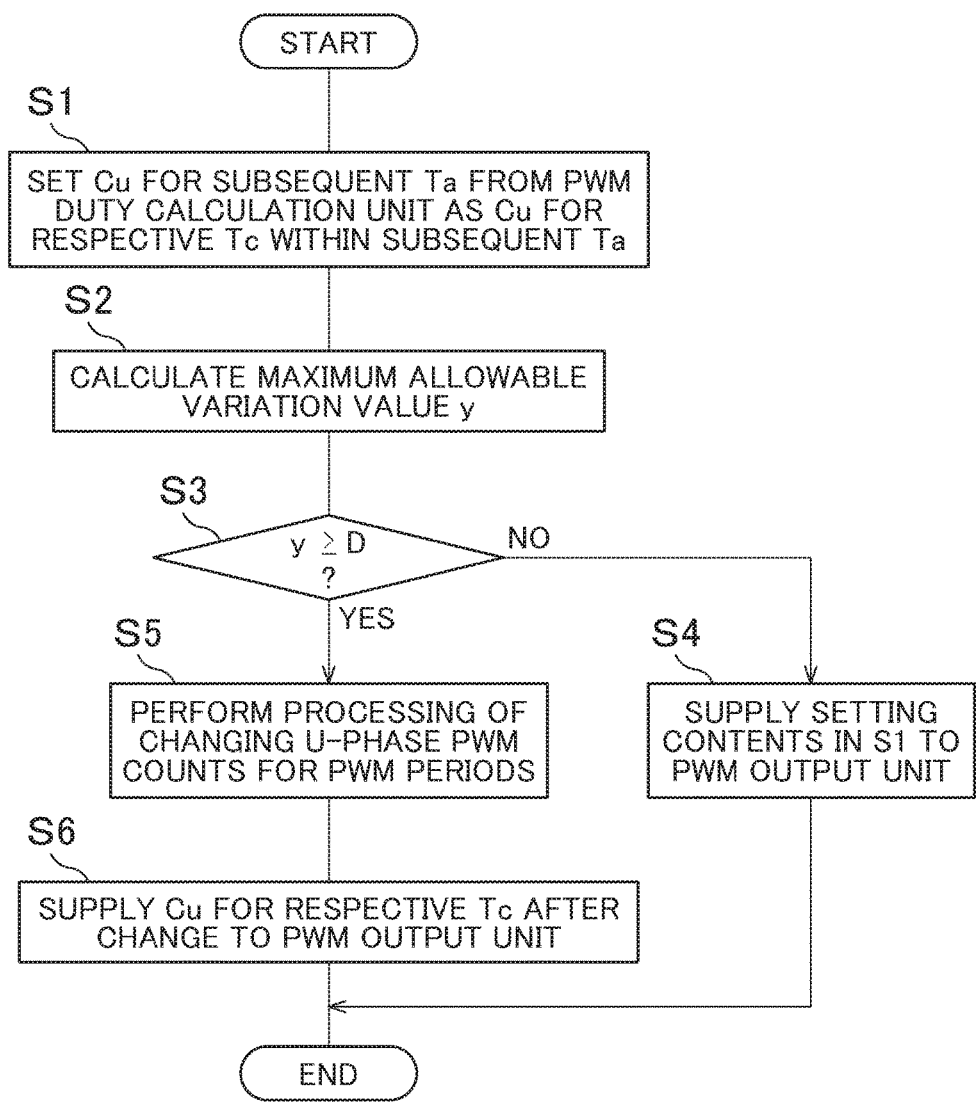
FIG. 7 is a flowchart for describing an example of operation to be performed by a maximum spectrum peak reduction unit.

In a case of n=10, it is appropriate that variations based on a variation pattern illustrated in, for example, FIG. 6F be added to the U-phase PWM counts Cu set for the respective PWM periods Tc within the subsequent current control period Ta. In FIG. 6F, it is assumed that 10 PWM periods Tc are included in the current control period Ta. FIG. 7 is a flowchart for describing an example of the operation to be performed by the maximum spectrum peak reduction unit 47. FIG. 7 is a flowchart for describing only the operation for calculating the U-phase PWM counts.

Figure 8A:
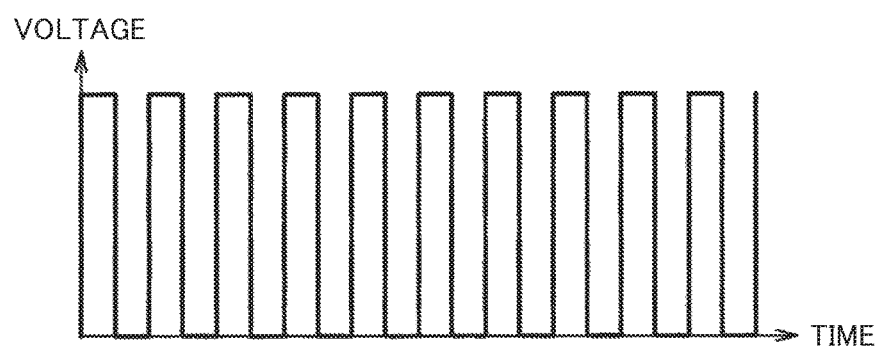
FIG. 8A is a waveform diagram illustrating an example of a PWM signal waveform corresponding to PWM counts before a change.
Figure 8B:
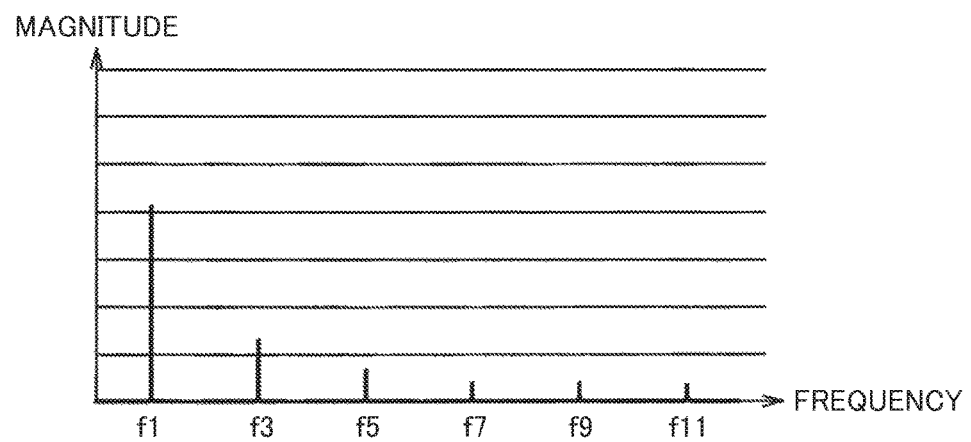
FIG. 8B is a spectral diagram illustrating a spectrum of the PWM signal waveform of FIG. 8A.

First, the maximum spectrum peak reduction unit 47 sets a U-phase PWM count Cu for a subsequent current control period Ta, which is supplied from the PWM duty ratio calculation unit 46, as U-phase PWM counts Cu for respective PWM periods Tc within the subsequent current control period Ta (Step S1). When the maximum PWM count Cmax is 1000 and the U-phase PWM count for the subsequent current control period Ta, which is supplied from the PWM duty ratio calculation unit 46, is 500, a PWM signal waveform corresponding to the U-phase PWM counts for the respective PWM periods Tc within the subsequent current control period Ta is as illustrated in FIG. 8A. A spectrum of the PWM signal waveform of FIG. 8A is as illustrated in FIG. 8B. That is, the spectrum of the PWM signal waveform of FIG. 8A shows peaks at, for example, frequencies $f_1$, $f_3$, $f_5$, $f_7$, $f_9$, and $f_{11}$.

In FIG. 8B, $f_1$ represents a carrier frequency, and $f_3$, $f_5$, $f_7$, $f_9$, and $f_{11}$ represent frequencies corresponding to integral multiples of the carrier frequency $f_1$. In this example, the PWM signal waveform has a duty ratio of 50%. Therefore, $f_3$, $f_5$, $f_7$, $f_9$, and $f_{11}$ represent frequencies that are three times, five times, seven times, nine times, and 11 times as high as the carrier frequency $f_1$. That is, the PWM signal waveform in this case includes a frequency component having the same frequency as the carrier frequency $f_1$ and harmonic components having frequencies corresponding to odd multiples of the carrier frequency $f_1$. However, the PWM signal waveform does not include harmonic components having frequencies corresponding to even multiples of the carrier frequency $f_1$.

Next, the maximum spectrum peak reduction unit 47 calculates a maximum value of variations (hereinafter referred to as "maximum allowable variation value y") by which the U-phase PWM counts Cu for the respective PWM periods Tc, which are set in Step S1, can be varied to both positive and negative sides within a range from 0 to the maximum PWM count Cmax (Step S2). Specifically, when Cu represents the U-phase PWM count for the subsequent current control period Ta, which is supplied from the PWM duty ratio calculation unit 46, and Cmax represents the maximum PWM count (Cmax=1000 in the example described above), the maximum spectrum peak reduction unit 47 calculates A=Cmax−Cu and B=Cu−0. The maximum spectrum peak reduction unit 47 determines a smaller value of A and B as the maximum allowable variation value y. For example, in a case of Cmax=1000 and Cu=600, the maximum allowable variation value y is 400. In a case of Cmax=1000 and Cu=20, the maximum allowable variation value y is 20. In a case of Cmax=1000 and Cu=500, the maximum allowable variation value y is 500.

Next, the maximum spectrum peak reduction unit 47 determines whether the maximum allowable variation value y is equal to or larger than a predetermined threshold D (D>0) (Step S3). The threshold D is set to a predetermined value equal to or larger than the variation definition value x described above. When the maximum allowable variation value y is smaller than the threshold D (Step S3: NO), the maximum spectrum peak reduction unit 47 supplies the U-phase PWM counts for the respective PWM periods Tc within the subsequent current control period Ta, which are set in Step S1, to the PWM output unit 48 (Step S4). The maximum spectrum peak reduction unit 47 finishes the processing in the current control period Ta of this time.

When it is determined in Step S3 that the maximum allowable variation value y is equal to or larger than the threshold D (Step S3: YES), the maximum spectrum peak reduction unit 47 proceeds to Step S5. In Step S5, the maximum spectrum peak reduction unit 47 performs processing of changing the U-phase PWM counts for the respective PWM periods Tc within the subsequent current control period Ta, which are set in Step S1 (hereinafter referred to as "processing of changing the U-phase PWM counts for the PWM periods Tc" in some cases).

In the processing of changing the U-phase PWM counts for the PWM periods Tc, the maximum spectrum peak reduction unit 47 changes the U-phase PWM counts for the respective PWM periods Tc within the subsequent current control period Ta, which are set in Step S1, in accordance with any one of the variation patterns illustrated in, for example, FIG. 6A to FIG. 6F above. For example, it is assumed that the non-volatile memory 61 stores a variation table based on the variation pattern corresponding to frequency division by a factor of 2 (n=2) as illustrated in FIG. 6A. FIG. 9A illustrates an example of the variation table based on the variation pattern illustrated in FIG. 6A (hereinafter referred to as "variation table for frequency division by a factor of 2"). FIG. 9A illustrates an example of a case where the variation definition value x is 50. It is assumed that the maximum PWM count Cmax is 1000 and the U-phase PWM count Cu set in Step S1 is 500.

The maximum spectrum peak reduction unit 47 changes the U-phase PWM counts for the respective PWM periods Tc within the subsequent current control period Ta, which are set in Step S1, in accordance with the variation table for frequency division by a factor of 2 in FIG. 9A. That is, as illustrated in FIG. 10, corresponding variations (+50 or −50) in the variation table for frequency division by a factor of 2 are added to the U-phase PWM counts for the respective PWM periods Tc. In this manner, the U-phase PWM counts for the respective PWM periods Tc are changed. The total of the U-phase PWM counts after the change is equal to the total of the U-phase PWM counts before the change.

Figure 11A:
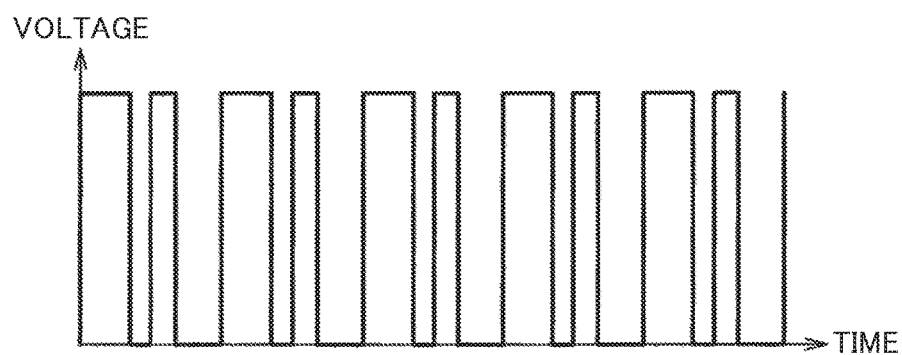
FIG. 11A is a waveform diagram illustrating an example of a PWM signal waveform corresponding to PWM counts after the change.
Figure 11B:
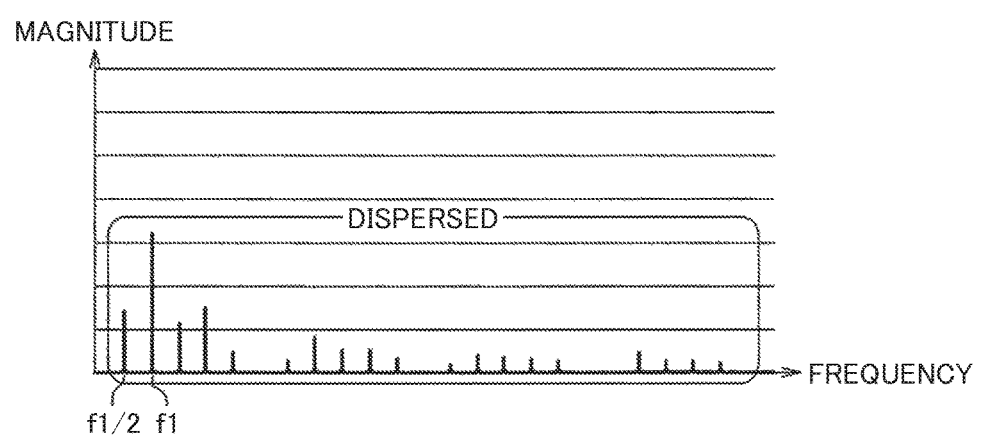
FIG. 11B is a spectral diagram illustrating a spectrum of the PWM signal waveform of FIG. 11A.

In this case, it is assumed that a PWM signal waveform corresponding to the U-phase PWM counts for the respective PWM periods Tc before the change (hereinafter referred to as "PWM signal waveform corresponding to the PWM counts before the change" in some cases) is the waveform illustrated in FIG. 8A. Then, a PWM signal waveform corresponding to the U-phase PWM counts for the respective PWM periods Tc after the change (hereinafter referred to as "PWM signal waveform corresponding to the PWM counts after the change" in some cases) is illustrated in FIG. 11A. A spectrum of the PWM signal waveform of FIG. 11A is illustrated in FIG. 11B. That is, the spectrum of the PWM signal waveform of FIG. 11A shows peaks at a frequency $f_{1/2}$ that is a half of the carrier frequency $f_1$ and frequencies corresponding to integral multiples of the frequency $f_{1/2}$ in addition to the carrier frequency $f_1$ and the frequencies corresponding to integral multiples of the carrier frequency $f_1$.

Comparing the spectrum of FIG. 11B with the spectrum of FIG. 8B, it is understood that the frequency components included in the PWM signal waveform corresponding to the PWM counts after the change are dispersed into more frequency components than the frequency components included in the PWM signal waveform corresponding to the PWM counts before the change. Thus, frequency components of noises originating from the PWM signal waveform corresponding to the PWM counts after the change are also dispersed into more frequency components than those before the change of the PWM counts. As a result, it is possible to reduce a maximum-amplitude noise component having the same frequency as the carrier frequency.

When the processing of Step S5 is finished, the maximum spectrum peak reduction unit 47 supplies the U-phase PWM counts Cu for the respective PWM periods Tc after the change to the PWM output unit 48 as U-phase PWM counts Cu for the respective PWM periods Tc within the subsequent current control period Ta (Step S6). The maximum spectrum peak reduction unit 47 finishes the processing in the current control period Ta of this time.

A reference variation value table illustrated in FIG. 9B, which stores reference variation values each having an absolute value of 1, is used in place of the variation table of FIG. 9A described above. Variations for changing the U-phase PWM counts for the respective PWM periods Tc may be obtained by multiplying the reference variation values in the reference variation value table by the variation definition value x. At this time, the variation definition value x may be obtained based on the maximum allowable variation value y. For example, the variation definition value x can be set to a predetermined percent (for example, 10%) of the maximum allowable variation value y.

The U-phase PWM counts for the respective PWM periods Tc within the subsequent current control period Ta, which are set in Step S1, may be changed based on a pattern obtained by combining variation patterns corresponding to a plurality of types of frequency division. For example, it is assumed that the non-volatile memory 61 stores the variation table for frequency division by a factor of 2 as illustrated in FIG. 9A and a variation table for frequency division by a factor of 10 as illustrated in FIG. 12. The variation table for frequency division by a factor of 10 is a variation table corresponding to the variation pattern for frequency division by a factor of 10 in FIG. 6F. The variation definition value x used in the variation table for frequency division by a factor of 2 is 50. The variation definition value x used in the variation table for frequency division by a factor of 10 is 25. It is assumed that the maximum PWM count Cmax is 1000 and the U-phase PWM count Cu set in Step S1 is 500. In this case, as illustrated in FIG. 13, total values of corresponding variations in the variation table for frequency division by a factor of 2 and corresponding variations in the variation table for frequency division by a factor of 10 are added to the U-phase PWM counts for the respective PWM periods Tc. In this manner, the U-phase PWM counts for the respective PWM periods Tc are changed.

The variation definition value x and the type of variation table (type of frequency division ratio) may be changed for each of the U-phase, the V-phase, and the W-phase. When the variation table cannot be applied to all of the phases, the PWM counts may be changed for only a phase to which the variation table can be applied. In the embodiment described above, description is given of the case where the present invention is applied to the motor controller for the electric power steering system. However, the present invention is also applicable to a motor controller to be used for other purposes than the electric power steering system.

In addition, various design modifications may be made within the scope of the matter described in the claims.

What is claimed is:

1. A motor controller configured such that a plurality of PWM periods are included in a current control period and an electric motor is controlled based on PWM signals generated for the respective PWM periods within the current control period, the motor controller comprising:
   a PWM count generator configured to generate a PWM count for each current control period;
   a PWM count changer configured to set a PWM count generated by the PWM count generator for a specific current control period as PWM counts for respective PWM periods within the specific current control period, and to change the set PWM counts for the respective PWM periods within the specific current control period so that a frequency component having a frequency obtained by dividing a carrier frequency in half or less is included in a PWM signal waveform within the specific current control period without changing a total value of the PWM counts for the respective PWM periods; and
   a PWM signal generator configured to generate PWM signals for the respective PWM periods based on the PWM counts for the respective PWM periods within the specific current control period after being changed by the PWM count changer.

2. The motor controller according to claim 1, wherein the PWM count changer is configured to change the set PWM counts for the respective PWM periods within the specific current control period so that a frequency component having a period that is n times as long as the PWM period is included in the PWM signal waveform within the specific current control period without changing the total value of the PWM counts for the respective PWM periods, provided that n is an integer equal to or larger than 2.

3. The motor controller according to claim 2, further comprising a variation table that stores PWM count variations, which amount to zero in total, in advance for respective PWM periods included in each current control period, the PWM count variations being set so that the frequency component having the period that is n times as long as the PWM period is included in a PWM signal waveform within the current control period, wherein
   the PWM count changer is configured to change the set PWM counts for the respective PWM periods within the specific current control period by adding the corresponding PWM count variations in the variation table to the PWM counts for the respective PWM periods.

\* \* \* \* \*